455-503 AU 233 EX

FIP8106 XR 4,091,273 / X5605D

United States Patent [19]

Fuller et al. X5322Y

[11] 4,091,273

[45] May 23, 1978

[54] ELECTRO-OPTICAL SWITCHING SYSTEM

[75] Inventors: William Brewster Fuller, Stamford; Edwin F. Potter, Jr.; Melvin Arnold Marcus, both of Westport, all of Conn.

[73] Assignee: United Technologies Corporation, Hartford, Conn.

[21] Appl. No.: 751,559

[22] Filed: Dec. 17, 1976

[51] Int. Cl.[2] ............ H04B 9/00

[52] U.S. Cl. ............ 250/199

[58] Field of Search ............ 250/199; 358/210, 194

[56] References Cited

U.S. PATENT DOCUMENTS

| | | | |
|---|---|---|---|
| 3,205,303 | 9/1965 | Bradley | 358/210 |
| 3,475,092 | 10/1969 | Harvey | 250/199 |
| 3,507,988 | 4/1970 | Holmes | 358/210 |
| 3,531,205 | 9/1970 | Nussmeier | 250/199 |
| 3,699,248 | 10/1972 | McKechnie | 358/210 |
| 3,916,094 | 10/1975 | Marrone | 358/210 |
| 3,928,760 | 12/1975 | Isoda | 250/199 |
| 3,932,742 | 1/1976 | Freudenschuss | 250/199 |
| 3,937,949 | 2/1976 | Ishikawa | 250/199 |

*Primary Examiner*—Howard W. Britton
*Attorney, Agent, or Firm*—Dominic J. Chiantera

[57] ABSTRACT

An electro-optical switching system includes a plurality of visually activated switches, one for each one of a plurality of different electronic apparatus, each including electromagnetic radiation sensors having a detection surface and each controlling the application of electrical power to the respective equipment in response to an impinging electromagnetic beam incident at the detection surface for a determined time interval. A pulsed electromagnetic beam is provided by a transmitter included within an electromagnetic activating source held, or disposed on a portion of the anatomy of, a human operator who aligns the beam with the detection surface on the selected one of the switches with the aid of a visual reticle image provided by a reticle generator included in the activating source and boresighted with the transmitter. The system further includes a control unit responsive to each of the radiation sensors for discriminating between the pulsed electromagnetic beam energy and the ambient energy background, and for providing actuating signals to the respective equipment in response to the presence of incident pulsed electromagnetic energy at the associated visually activated switch detection surface for a determined time interval in the absence of incident pulsed electromagnetic energy at each of the other switches within the same time interval, the control unit providing actuation of the various selected equipment, sequentially, one at a time.

8 Claims, 8 Drawing Figures

ACT
ACT FIG. 5
ACT
CLOCK
DVDR
SIGNAL PROC

SENSOR
SENSOR FIG. 2
SENSOR
VOLT SOURCE
RET GEN
SW

MONO STBLE
FLTR
F/F
DVDR
RESET & INHIB CNTR

ELECTRO-OPTICAL SWITCHING SYSTEM

The government has rights in this invention pursuant to Contract No. F33615-76-C-0514 awarded by the Department of the Air Force, Aeronautical Systems Division (AFSC).

BACKGROUND OF THE INVENTION

1. Field of Invention

This invention relates to control switching systems, and more particularly to an electro-optical switching system which provides visual selection and remote actuation of a plurality of switchable electronic apparatus within a field of view of a human operator.

2. Description of the Prior Art

The development of larger and faster aircraft, both commercial and military, has resulted in an increase in the number of sophisticated and complex airborne avionics systems added to the aircraft which have substantially increased the amount of cockpit instrumentation and the work load of the pilot and cockpit crew. Furthermore, these new avionic systems, which include navigational aids, engine performance monitoring systems, and automatic flight control systems, require some type of constant actuation during flight. The proliferation of such avionic equipment is most severe in the development of modern military aircraft, where in addition to such systems as navigation and engine control, the added avionics further include sophisticated radar systems and an array of sophisticated weapon delivery systems. The military pilot is constantly actuating such equipment to provide the required information readouts, or work function. For both commercial and military pilots, the manual cockpit switching of the plurality of cockpit mounted instruments, and equipment, is a procedural distraction that the pilot, and/or air crews in general, are trained to tolerate. However, the busy times of a pilot, both military and commercial, involve critical flight regimens where the activities required in manually switching the various cockpit instrumentation may cause a measurable reduction in operational effectiveness and, subsequently in flight safety margins. Although the problem may be more severe in a military aircraft involving a single pilot, where critical airborne operation includes air-to-air refueling, low level flight, aircraft carrier landing and takeoff, ordinance delivery patterns and air combat maneuvering, the commercial pilot is similarly burdened with the work load and concentration involved in landing and taking off from congested commercial airports.

At the present time, such pilot actuation of the cockpit mounted instruments and equipment requires manual switching of the selected equipment. This results in both pilot distraction in the time required to perform such manual switching, and in addition requires the freeing up of a hand which would otherwise remain on the throttle or stick. Such pilot motion in bending, and/or leaning forward to provide these switching functions could adversely affect the flight attitude of the aircraft causing momentary, or transient discontinuities in flight. As may be appreciated, these transient disturbances in aircraft control could result in disaster where such transients occur in a critical, high speed flight maneuver. At the present time, there are no suitable alternatives to this manual switching procedure, i.e. no systems which permit "hands off" actuation of equipment other than that having throttle, or stick mounted switches.

SUMMARY OF THE INVENTION

An object of the present invention is to provide an electro-optical switching system for providing visual selection and remote actuation of selected electronic apparatus. Another object of the present invention is to provide an electro-optical switching system having a high degree of switching accuracy and substantially zero false alarm rate, which is suitable for use in an aircraft cockpit environment for providing visual selection and hands off actuation of selected electronic apparatus on the aircraft.

According to the present invention, an electro-optical switching system includes an activating source, disposable on the anatomy of an operator, and having a transmitter selectably operable in more than one operating state for providing, in a first state, a beam of electromagnetic energy at a determined carrier frequency within the optical frequency spectrum, the transmitter providing the beam in a spatial direction determined by the operator. Visually activated switches, one each for each of the electronic apparatus, each disposed at a determined visual acuity distance within the field of view of the operator, and each including an electromagnetic radiation sensor having a radiation detection surface for providing a signal manifestation in response to, and coincident with, electromagnetic energy incident on the detection surface at the determined carrier frequency. A control unit responsive to the signal manifestations from each of the radiation sensors provides actuation of the selected electronic apparatus in response to the presence of signal manifestations from a corresponding one of the sensors in the concurrent absence of signal manifestations from each of the other sensors. In further accord with the present invention, the activating source transmitter provides a pulse modulated electromagnetic beam at a determined pulse repetition frequency, the electromagnetic radiation sensors being responsive only to electromagnetic energy incident on the detection surface at the determined carrier and pulse repetition frequency of the electromagnetic beam, to provide a signal manifestation having the same pulse repetition frequency. In still further accord with the present invention, the control unit provides in response to a signal manifestation from a single one of the sensors, an arming signal at the end of a first determined time interval in dependence on the continuous presence of the signal manifestation from the respective sensor during the first determined time interval and the concurrent absence of a signal manifestation from each of the other sensors within the same first time interval, the control unit maintaining the arming signal during the continued presence of the signal manifestation from the respective one of the sensors in the absence of signal manifestations from each of the other sensors, the control unit maintaining the arming signal for a second determined in the absence of a signal manifestation from all of the sensors, the control unit further providing a control actuating signal in response to the selected operation of the transmitter in another state, other than the first state, during the presence of an arming signal; the control unit including actuator circuits, one for each of the visually activated switches, and each associated with a corresponding one of the selectable apparatus, each actuator being responsive to the control actuating signals and arming signals associated with the corresponding apparatus, for providing a visible indication of the selected one of the visually selectable apparatus in response to the presence of an associated arming signal, and providing actuation of the selected apparatus in response to the presence of an associated control actuating signal, the actuation including the energizing and de-energizing of the apparatus in dependence on the existing operating state prior to actuation. In still further accord with the present invention, each of the visually activated switches further includes a manual switch for providing a manual actuating signal to the associated one of the actuator circuits in response to manual activation by the operator, each actuator providing actuation of the associated apparatus in response to both manual actuating signals and control actuating signals.

In still further accord with the present invention, the activating source further includes a reticle generator for providing a visible reticle image having a visually identifiable center, the visible reticle image being provided by the reticle generator concurrent with the presence of the electromagnetic beam from the transmitter, the reticle generator being boresighted with the transmitter and the reticle image aligned with the beam at the determined visual distance, such that the electromagnetic beam intersects the center of the reticle image at the determined distance.

The electro-optical switching system of the present invention provides a highly accurate system for performing visual selection and remote actuation of selected electronic apparatus, concurrent with the ability of providing manual actuation of the same apparatus. In an aircraft embodiment of the electro-optical system the pilot is capable of providing "hands off" actuation of visually selected cockpit instrumentations without removing his hands from the aircraft throttle, or stick, thereby greatly enhancing the safety margin during critical flight maneuvers. Similarly the provision for simultaneous mechanical actuation of the same equipment allows for increased flexibility in permitting a choice in actuation methods by the pilot, as may be required in certain reaction situations.

These and other objects, features and advantages of the present invention will become more apparent in the light of the following detailed description of preferred embodiments thereof, as illustrated in the accompanying drawing.

DESCRIPTION OF THE PREFERRED EMBODIMENT

Figure 6:
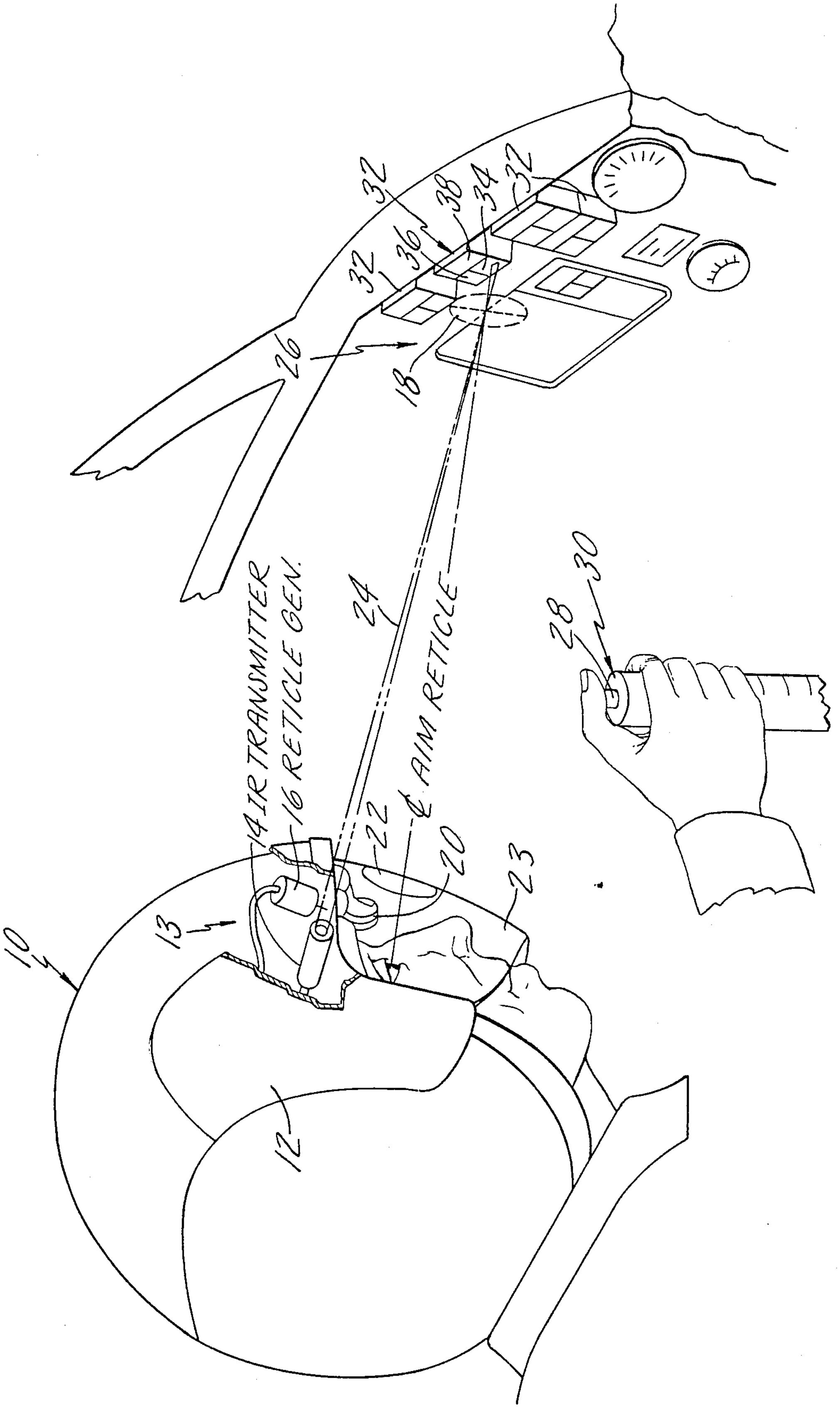
FIG. 6 is an illustration of a preferred embodiment of the electro-optical switching system according to the present invention.

Referring first to FIG. 6, in an illustration of one embodiment of the electro-optical switching system of the present invention as may be used in a military aircraft, a helmet 10 worn by the pilot has a visor assembly 12 extending across his visual field of view. An electromagnetic activating energy source 13, including a transmitter 14 and a reticle generator 16, is suitably disposed on an inside portion of the visor 12 in such a manner as to permit free movement of the visor. The reticle generator 16 presents a visible, optical reticle image 18 to a mirror assembly 20 which deflects the image onto a portion 22 of the visor faceplate 23, located directly in front of the pilot's eye. The inside surface of the portion 22 is coated with a reflective coating which changes the transparency characteristic of that portion of the visor faceplate from approximately 90 percent transparent to approximately 60 percent transparent and 40 percent reflective. The increased reflectivity provides an enhanced optical reticle image to the pilot's eye without adverse effects resulting from the reduced transparency in the single portion of the visor faceplate. The transmitter 14 transmits an electromagnetic energy beam 24, and depending on the required mounting configuration, the transmitter mounting apparatus may include a highly reflective mirror for "folding" the optical axis of the transmitted beam downward, and a "hot mirror" for reflecting the beam energy forward. However, the use of such mirrors are dependent on the required mounting conditions and helmet configuration with consideration given to minimizing parallax error between the centerline of the transmitted beam and the reticle image centerline. Similarly the transmitter mounting assembly may be adjustable in both azimuth and elevation to allow adjustment of the boresighting between the beam and the reticle image.

Under nominal mounting conditions, the transmitted light beam centerline is slightly above the reticle centerline at the surface of the visor, and intersects the reticle centerline at a determined visual distance from the visor. The visual acuity of the operator, or pilot, determines the maximum operating distance, however, in a given embodiment the distance may be less, such as the determined distance (L) between the pilot's head and the cockpit instrument panel 26. The transmitted beam and the reticle image are focused at the distance L to provide an incident beam on the instrument panel with a surface irradiation area of approximately one-half inch square.

The reticle generator 16 and transmitter 14 are energized by a trigger switch assembly 28 having a number of control positions, and suitably disposed on the stick, or throttle 30 of the aircraft. The trigger switch 28 may be a multi-contact, two detent position, momentary pushbutton type, which when depressed to a first detent position energizes the reticle generator 16 which provides the optical reticle image 18 in the pilot's line of sight. As described in detail hereinafter, in the operation of the system the pilot aims the centerline of the reticle image at a selected one of a plurality of visually activated switches (VAS) 32, which are relatively disposed on the instrument within the pilot's field of view, and which are adjacently spaced at a distance greater than the maximum dimension of the irradiation surface area of the incident beam. Each VAS is associated with one of a number of different electronic apparatus which are selectably operable by the pilot, and each includes two functional components: a manual push to activate switch assembly of a type known in the art, which may comprise the entire faceplate assembly of each VAS switch, and an electromagnetic radiation sensor located within a quadrant 34 of the VAS faceplate. As described in detail hereinafter, the manual switches provide manual actuation of the selected apparatus which may be performed at any time at the option of the operator, and which overrides the visual selection and actuation of the electro-optical system. For visual selection, the reticle image is aimed at a detection surface of the sensor in the quadrant 34 of the associated VAS, and the switch 28 is depressed to a second detent position which turns on the transmitter 14 to provide the electromagnetic beam 24. The electromagnetic sensor detects the incident beam and causes the generation of an arming signal which provides a visual signal, such as energizing an ARM lamp 36, which identifies the VAS and the associated equipment selected. Releasing the switch 28 while the visually selected switch 32 is armed actuates the associated equipment and changes its state from OFF to ON, or alternatively from ON to OFF, depending upon its initial state. The operating state of the equipment is indicated on the VAS by a lamp assembly 38, which may provide white illumination for OFF and green for ON.

Only one VAS 32 can be armed at a time. If the pilot inadvertently arms the wrong switch, moving the aim reticle to the correct switch and irradiating the switch sensor with the beam will arm it and disarm the incorrect switch. A switch will remain armed while it is being irradiated by the beam 24, and for a determined time interval thereafter, after which if it has not been actuated by releasing the trigger switch 28 it will automatically disarm. Therefore, if the pilot keeps the trigger 28 depressed, but looks away from the armed switch, the switch will automatically disarm after the preset time interval. In addition, to avoid spurious operation due to unintended transient irradiation, the visually activated switches 32 must be irradiated by the beam for a determined minimum time interval before it is armed. The visually activated switches 32 are operable at sizable off axis angles, consistent with their use anywhere on a typical cockpit instrumentation panel. The aiming point on a switch can be selected on a basis of human factor considerations and an offset aim point can be used when the system is boresighted. The reticle image 18 may be focused at infinity (collimated) and the transmitter 14 focused at the centerline of the reticle image 18 at the required distance L, typically 28 to 30 inches for a cockpit installation, or in a system where the only function is the visual activation of the switches the reticle image can be focused at the same distance L as the transmitted beam, making the helmet fit noncritical. All of these operating characteristics of the electro-optical switching apparatus as used in an aircraft cockpit installation, are described in detail with respect to FIG. 1.

Figures 1, 4:
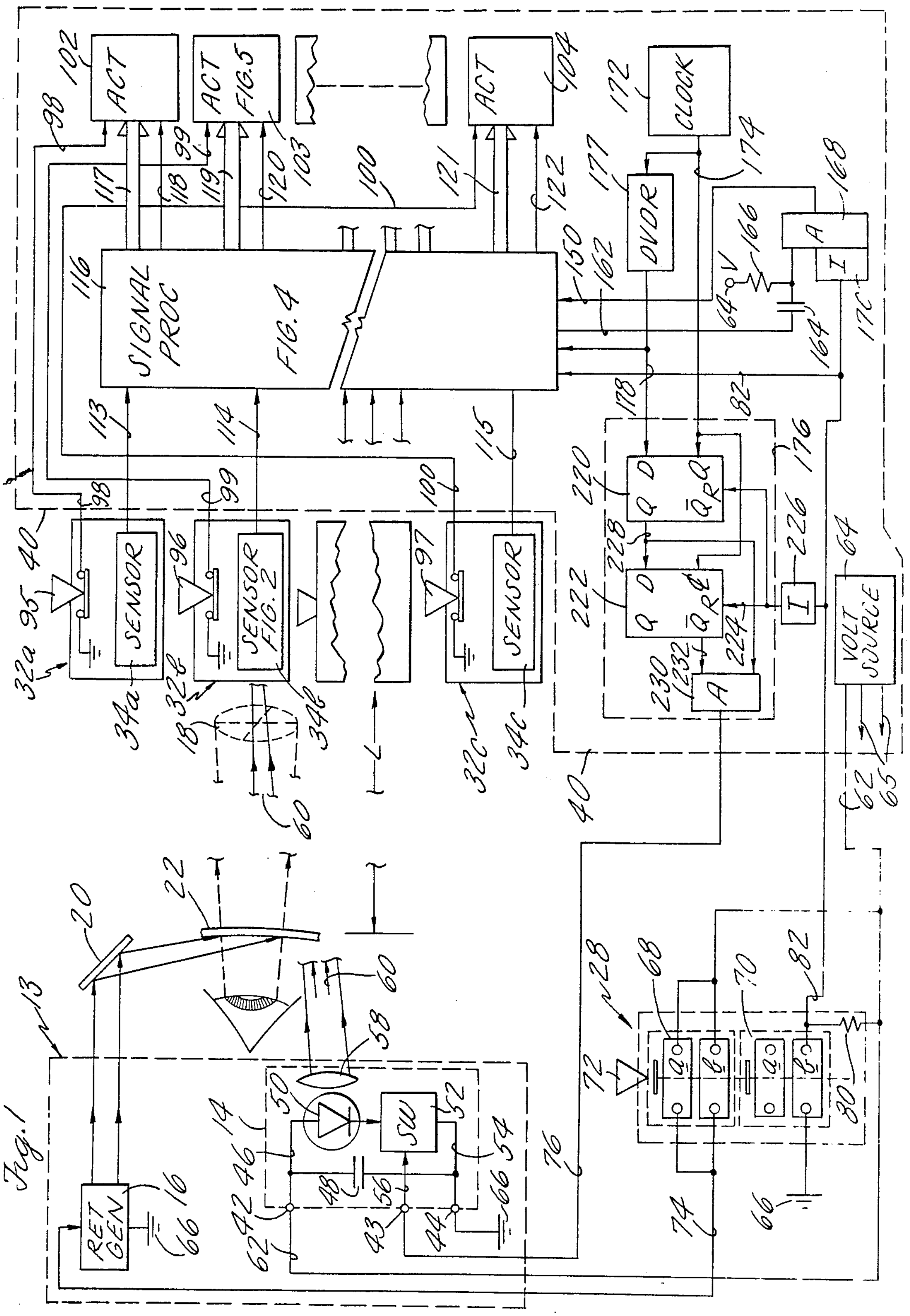
FIG. 1 is a system block diagram of one embodiment of an electro-optical switching system according to the present invention.
FIG. 4 is a schematic diagram of another portion of the system block diagram of FIG. 1.
Figure 5:
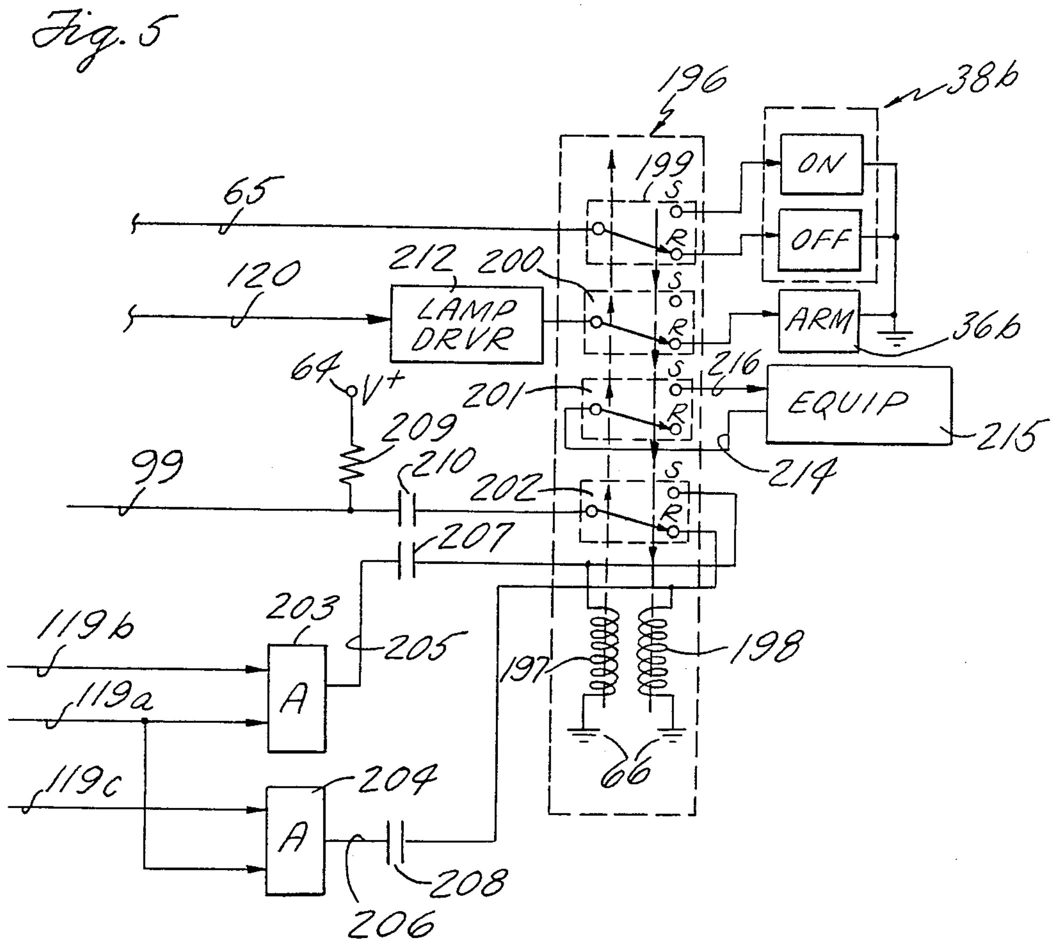
FIG. 5 is a schematic diagram of still another portion of the embodiment of FIG. 1.

Referring now to FIG. 1, an electro-optical switching system according to the present invention for use in an aircraft cockpit for visually selecting and remotely actuating cockpit instrumentation includes four major system components: the activating energy source 13, including the IR transmitter 14 and reticle generator 16, each mounted to a suitable portion of the pilot's flight uniform, such as the helmet mount 10 of FIG. 5; a trigger switch assembly 28 mounted to the aircraft stick, or throttle; a plurality of visually activated switches 36a through 36c; and a control unit 40 which includes the control logic for providing selected actuation of the desired equipment. In the embodiment of FIG. 1, the electromagnetic beam provided by the transmitter has a carrier frequency within the infrared portion of the optical frequency spectrum. The infrared spectrum is desirable for use in the cockpit embodiment because it is invisible to the human eye and precludes distraction of the pilot during transmitter operation, such as may occur with the use of white light having wavelengths on the order of 400 to 700 nanometers. Also, the invisible infrared beam cannot be openly observed by an enemy which may expose the presence of the aircraft. Similarly the use of laser light, such as a Nd.Yag laser with a wavelength of 1060 nanometers, is undesirable due to safety hazards within the confines of an aircraft cockpit. However, the electro-optical switching system of the present invention is not limited to the use of infrared light, and the transmitting light source may provide an electromagnetic beam at any wavelength within the optical frequency spectrum with due consideration given to the operating environment of the system.

The IR transmitter 14 has input terminals 42 through 44, and the terminal 42 is connected through a line 46 to one side of a capacitor 48 and to one side of a light emitting diode (LED) 50, which may be a gallium arsenide, infrared emitting diode, of a type known in the art, such as the Spectronics model SE-3450-3, which emits an infrared (IR) light beam at a wavelength of 930 nanometers. The cathode of the LED 50 is connected through a voltage control switch 52, such as a transistor, and a line 54 to the terminal 44, and to the other side of the capacitor 48, such that the capacitor 48 is electrically connected in parallel with the series combination of the LED 50 and the switch 52. The switch 52 has its gate input connected through a line 56 to the terminal 43. The transmitter 14 further includes a single element, plano-convex focusing lens 58, to provide focusing of the transmitted IR beam 60 at the determined focal distance L, such that the IR beam 60 is focused at the center of the reticle image 18 at the determined focal distance. The terminal 42 of the IR transmitter 14 is connected through a line 62 to a voltage source 64, included within the control unit 40, which provides the plurality of different magnitude voltage signals required for system operation, on the lines 65. The terminal 44 is connected to a ground plane 66.

The trigger switch 28 includes control positions 68, 70, each having a first and second detent (a), (b) which have a "make before break" characteristic. The sections are mechanically ganged together, such that depressing a button 72 to the first detent position provides electrical continuity through the (a) contacts of each position, and depressing the button 72 to the second detent provides electrical continuity through the (b) contacts. The voltage signal on the line 62 is presented to both detents, (a), (b) of section 68, the other sides of which are connected through a line 74 to one side of the reticle generator 16, the other side of which is connected to the ground plane 66. The terminal 43 of the IR transmitter 14 is connected through a line 76 to an output of the control unit 40, which, as described in detail hereinafter, provides a pulse modulated signal at a determined pulse repetition frequency ($f_1$) to the gate of the switch 52. The (b) detent of position 70 is connected on one side to the ground plane 66 and on the other side through a resistor 80 to the line 62, and through a line 82 to an input of the control unit 40. With the contact 70(b) open, the source 64 provides a voltage signal V on the line 82 corresponding to a logic one signal, which transitions to a logic zero signal when the contacts close in response to depression of the button 72 to the second detent position. As described in detail hereinafter, the presence of the pulsed signal on the line 76 is dependent on the presence of a logic zero signal on the line 82, such that the transmitter 14 is energized only during the presence of the logic zero signal on the line 82.

Figure 2:
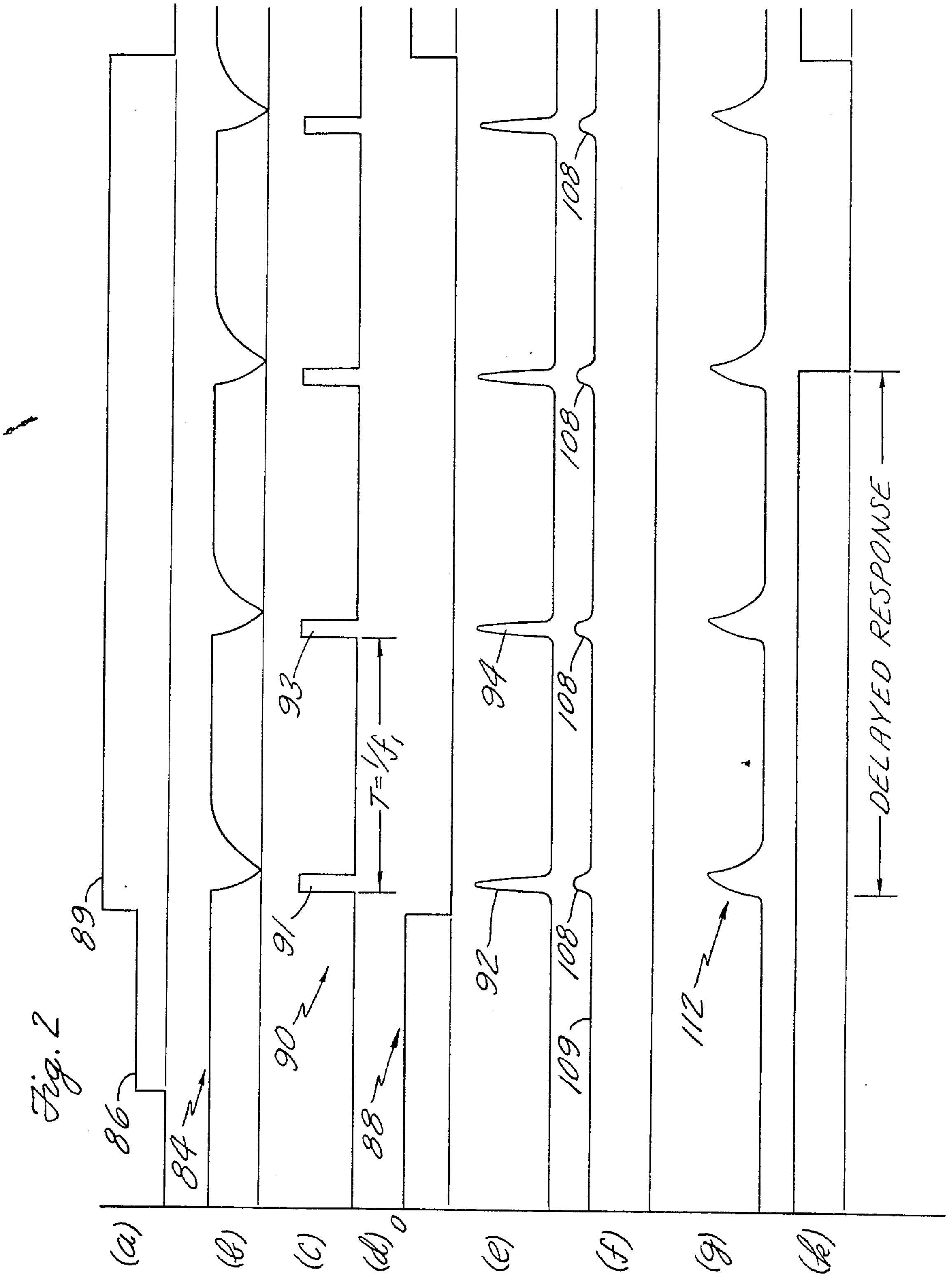
FIG. 2 is an illustration of switching wave forms provided by the embodiment of FIG. 1.

In the operation of the activating source 13, depression of the button 72 to the first detent position closes the contacts 68(a) presenting the voltage signal on the line 62 through the line 74 to the reticle generator 16, which energizes the reticle generator to provide the reticle image 18. However, since the contact 70(b) is open, there is no pulsed gate signal on the line 76 and the switch 52 is off preventing current flow through the LED 50. The capacitor 48 is charged to a steady state voltage value equal to the magnitude of the voltage signal on the line 62, as shown by wave form 84 in FIG. 2, illustration (b), and is unaffected by depression of the button 72 to the first detent, as shown at 86 of FIG. 2, illustration (a). Similarly, the voltage signal on the line 82 remains at a logic one level with the button in the first detent, as shown by the wave form 88 of FIG. 2, illustration (d). Depressing the button 72 to the second detent position (89, FIG. 2, illustration (a)) causes the signal on the line 82 to transition to a logic zero causing the pulsed gate signals (90, FIG. 2, illustration (c)) to appear on the line 76 to the gate input of the switch 52. The first pulse (91, FIG. 1, illustration (c)) turns on the switch 52 to provide a current path from the line 62 through the LED 50 and switch 52 to the ground 66, causing the capacitor 48 to discharge through the LED 50 and switch 52 (FIG. 2, illustration (b)). The capacitor discharge current provides excitation of the LED, causing illumination of the diode and emission of an infrared (IR) pulse (92, FIG. 2, illustration (e)). At the end of the gate pulse 91 the switch 52 turns off and the capacitor 48 charges to the steady state value on the line 62 prior to the appearance of a second pulse 93 on the line 76. The pulse 93 again causes discharge of the capacitor 48 and excitation of the LED 50, providing the IR pulse 94 (FIG. 2, illustration (e)). The process continues with the LED providing IR pulses coincident with the presence of the gate pulses on the line 76, such that the IR beam 60 is pulse modulated at a pulse repetition frequency (PRF) equal to $f_1$. The discharge current of the capacitor 48 provides substantially all of the required LED excitation current which is on the order of 3–4 amperes, with the current drain on the voltage source 64 typically on the order of 25–30 milliamperes. When the button 72 is fully released to open both contacts (a), (b) of positions 68, 70, a logic one signal is provided on the line 82 causing the removal of the pulse signals on the line 76, and the reticle generator 16 is de-energized.

The pulse modulated IR beam 60 is aimed by the pilot at a selected one of the plurality of visually activated switches 32*a*–32*c*, disposed in an array on the aircraft instrument panel 26 (FIG. 6) at the determined distance L. Each switch includes the electromagnetic radiation sensitive sensors 34*a*–34*c*, and manual switch assemblies 95–97. In FIG. 1, the switch assemblies 95–97 are shown as two-pole, press to activate type switches, connected on one side to the ground plane 66, and connected on the other side through the lines 97–100 to one input of a corresponding one of a plurality of actuator circuits 102–104, each actuator corresponding to an associated one of the visually selectable equipment.

Figure 3:
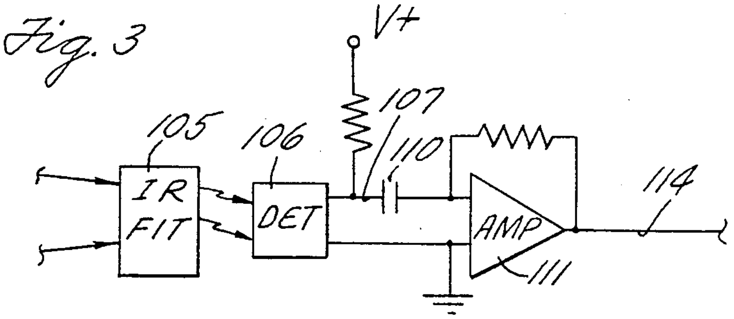
FIG. 3 is a schematic diagram of a portion of the system block diagram of FIG. 1.
Figure 4:
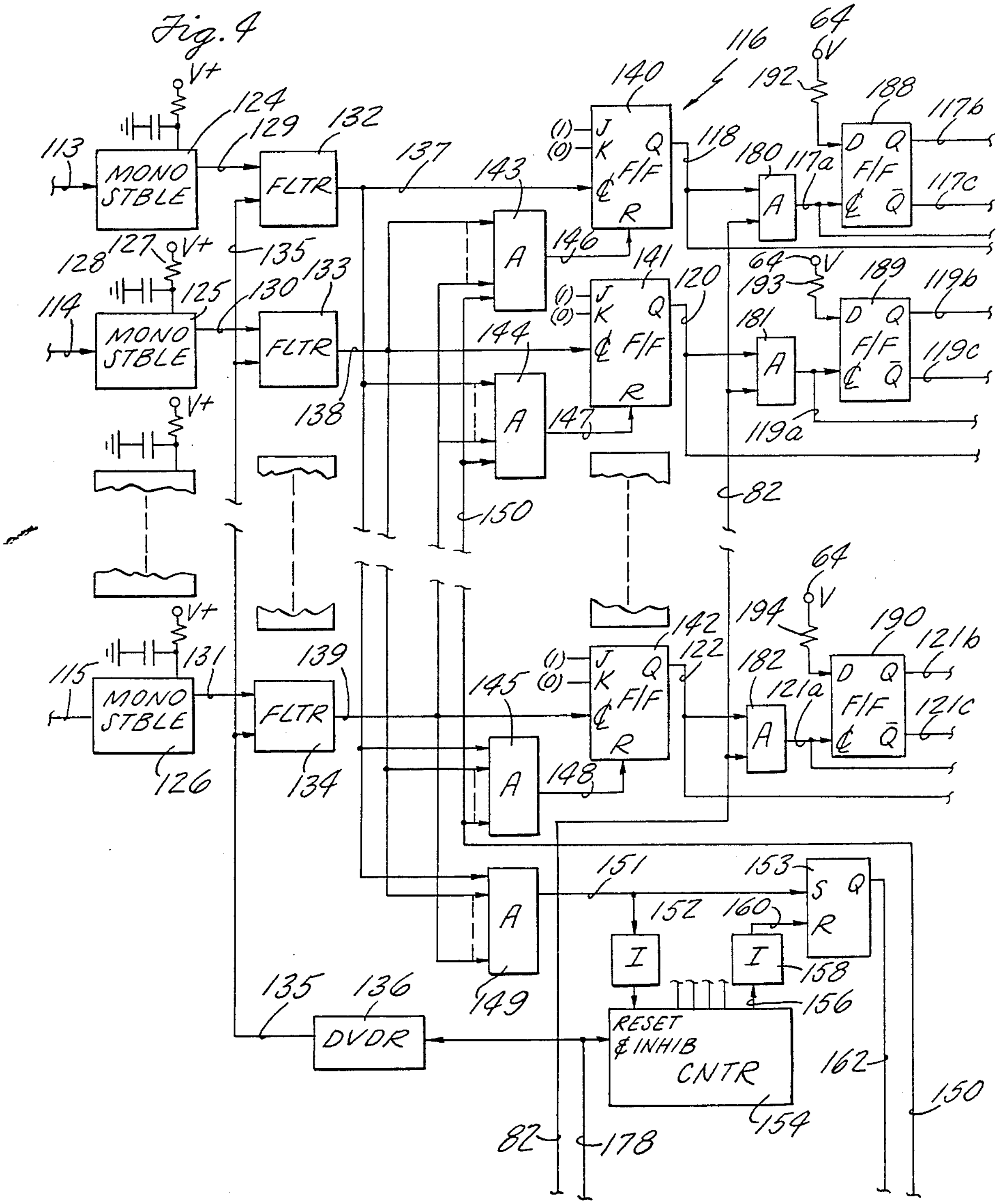

Referring now to FIG. 3, each of the sensors 34*a* through 34*c* includes an infrared transmitting filter 105, which has a 3 db cutoff point below the 930 nanometer wavelength of the IR pulse, and which provides transmission of the incident beam energy and rejection of the lower frequency ambient light within the cockpit. The filtered IR beam from the filter is presented to an infrared detector 106, of a type known in the art such as the Hewlett-Packard Model 5082–4207, which provides a pulsed voltage signal at a PRF equal to $f_1$ and a magnitude proportional to the intensity of the incident IR beam, on a line 107. While the filter 105 rejects the visible ambient light, the infrared component of the ambient sunlight is allowed to pass through the filter to the detector, such that the pulsed voltage signal (108, FIG. 2, illustration (f)) is superimposed on a large magnitude DC signal level (109, FIG. 2, illustration (f)) representative of the ambient sunlight infrared. The comparatively small magnitude pulses are coupled through a capacitor 110, which blocks the DC signal component, to the input of an operational amplifier 111, of a type known in the art such as the RCA CA 3130. The amplifier 111 is connected in a high gain configuration, and is excited from a single polarity, amplitude limited voltage signal, to provide a CMOS logic compatible signal output. In the embodiment of FIG. 1 the amplifier provides a substantially zero signal output in the absence of an input pulse from the capacitor 110, and provides a positive voltage level signal in response to each pulse presented from the capacitor, as shown by the wave form 112 of FIG. 2, illustration (g).

The output voltage signals from the sensors 34*a*–34*c* are presented through the lines 113–115 to corresponding inputs of a signal processor 116. As described in detail hereinafter with respect to FIG. 4, the signal processor 116 receives each of the sensor signals, and provides signal decoding and interrogation, to ensure actuation of the selected equipment corresponding to the proper visually activated switch on the instrument panel, and provides arming and control actuating signals through lines 117–118, 119–120, and 121–122 to the actuators 102–104 respectively.

Referring now to FIG. 4, the lines 113 through 115 are presented within the processor 116 to a corresponding one of a plurality of retriggerable, one shot monostables 124 through 126 of a type known in the art such as the Motorola MC14528, which provide stretching of the pulses on the lines. Each monostable provides an input time response in dependence on an external RC time constant, such as that provided to the monostable 125 by the resistor 127 and capacitor 128. The input time response of each monostable is equal to approximately 1.5 times the pulse repetition period of the $f_1$ pulse signal. As a result, each monostable provides a time delayed response to the input $f_1$ pulse signal, and once triggered remains in the response state as long as there is an $f_1$ signal presented at the input. In the embodiment of FIG. 4, the monostables 124 through 126 provide an inverted output signal response to the input signal from the sensors, as shown in FIG. 2, illustration (h), such that each monostable provides a stretched, inverted output signal which is at a logic zero level in the presence of an input pulse signal from a corresponding sensor, and which is at a logic one level at all other times. The output signals from the monostables are presented through the lines 129 through 131 to a corresponding one of a plurality of signal filters 132 through 134, of a type known in the art such as the Motorola MC14490, which discriminates against spurious input noise by providing a determined time delay ($\Delta T_1$) to the input signal by monitoring the presence of an input signal for a prescribed number of cycles of a clock signal presented through a line 135 to a second input of each filter. The signal on the line 135 is provided by a frequency divider 136 which divides down the system high frequency clock signal. For a typical time delay value of 0.10 second, the selected one of the selected visually activated switch must be irradiated by the IR beam for at least 0.1 second before a response signal is provided by the corresponding filter. The filters provide the 0.1 second time delay by monitoring the input signal for four cycles of a 40 hertz signal on the line 135. At the end of the time delay interval, the input signals are coupled through the filters without inversion, and are presented on lines 137 through 139.

The filter output signals are presented to arming signal circuitry which ensures that only one of the visually activated switches is energized at a time. The arming circuitry includes a plurality of bistable devices 140 through 142, such as JK flip flops, and a corresponding plurality of AND gates 143 through 145. The signals on the lines 137 through 139 are presented to the clock input of a corresponding one of the bistable devices 140 through 142. The AND gates 143 through 145 provide output signals through lines 146 through 148 to the RESET input of the respective flip flops 140 through 142. As shown in FIG. 4, the number of AND gates correspond to the number of filter output lines, and each AND gate is presented with all of the filter output lines except the one filter line presented to the clock input of the bistable device having its RESET input driven by the particular AND gate. As a result, the AND gate 143 is presented with lines 138, 139, but not line 137 while AND gate 144 is presented with lines 137, 139, but not the line 138, and so on. Therefore, for N filter networks, each AND gate is presented with the output signals from N - 1 filters. Each of the lines 137 through 139 are also presented to corresponding inputs of an AND gate 149. The AND gates 143 through 145 also receive an enabling gate signal on a line 150, which enables all of the AND gates during turn on of the transmitter 14 (FIG. 1). Referring to both FIGS. 1 and 4, the AND gate 149 provides an output AND signal on a line 151 to the input of an invert gate 152 and to the input of a bistable device 153, such as a SET-RESET flip flop. The invert gate 152 provides an inverted AND signal to a RESET input of a binary counter 154 of a type well known in the art such as the Motorola Model MC14536 binary counter. A selected binary count output is provided through a line 156 to an invert gate 158, the output of which is presented through a line 160 to the RESET input of the bistable 153. The Q output of the bistable is presented through a line 162 to one side of a capacitor 164 (FIG. 1) the other side of which is connected through a resistor 166 to the output of the voltage source 64, and to one input of an AND gate 168. The AND gate 168 is presented at a second input with the inverted line 82 signal provided by an invert gate 170. The output signal from the AND gate is the gate enable signal which is provided on the line 150 to the signal processor 116, where it is presented to an input of each of the AND gates 143 through 145. A system clock 172 provides a high frequency clock signal on a line 174 to a pulse forming network 176, and to a frequency divider 177 of a type known in the art. The divider 177 counts down the clock signal on the line 174 to provide a lower frequency clock signal through a line 178 to the counter 154 and to the frequency divider 136.

In the operation of the arming circuitry, when the button 72 of assembly 28 is not depressed, such that both the reticle generator 16 and transmitter 14 are off, or if the button is depressed to the first detent (a), such that the reticle generator alone is energized to provide the reticle image 18, the signal on the line 82 is at a logic one level, which is inverted by the gate 170 causing the AND gate 168 to provide a logic zero signal on the line 150 and inhibiting the AND gates 143 through 145. In addition, the output signals from the filters 132 through 134 on the lines 137 through 139 are all at a logic one level, i.e. the inversion of the zero signals from the sensors **34*a*–34*c* by the monostables 124 through 126. After the pilot aligns the center of the reticle image on the detection surface of the sensor within the selected one of the visually activated switches, and depresses the button 72 to the second detent (b) to turn on the transmitter, the signal on the line 82 transitions to a logic zero, and the signal on the line 150 transitions to a logic one, enabling the AND gates 143 through 145. In response, all of the AND gates provide logic one signals on the lines 146 through 148 to the RESET input of the bistables 140 through 142 which enables them and resets the Q output of each to a logic zero state on the lines 118, 120 and 122 respectively. Although the transmitter is turned on and provides the pulsed IR beam, if none of the visually activated switches are irradiated, the signals on the lines remain at a logic one and the AND gate 149 provides a logic one signal on the line 151 to the bistable 153 and invert gate 152, enabling the counter 154. As long as none of the switches are irradiated the counter continues to count up through the selected count output, corresponding to a determined time delay $\Delta T_2$. At the selected count, a logic zero signal is provided on the line 160 to the RESET input to the bistable 153, resetting the Q output to a logic zero level. The capacitor 164 differentiates the Q output transition causing a transient zero at the input of the AND gate 168 which momentarily causes the signal on the line 150 to transition to a zero and inhibit the AND gates 143 through 145. The transient inhibit time duration is determined by the RC time constant provided by the resistor 166 and capacitor 164, which blocks the steady state Q output logic signal from the input of the AND gate 168, which in the steady state is presented with the logic one signal provided through the resistor 166. Since none of the switches were irradiated during the $\Delta T_2$ interval, the transient inhibit merely resets the bistables 140 through 142 a second time. Irradiation of one of the visually activated switches for the minimum $\Delta T_1$ time interval, causes the output from the corresponding one of the filters 132 through 134 to transition to a logic zero state. Assuming that the switch sensor 32*b* is irradiated, the signal on the line 138 transitions to a logic zero state, which causes the bistable 141 to transition to a logic one level at its Q output on the line 120, providing an arming signal to the actuator 103. The AND gates 143, 145 and 149 simultaneously transition to a logic zero, disabling the bistables 140, 142 which maintain a logic zero Q output, and resetting the counter to zero and maintaining a count inhibit. With the SET input of the bistable 153 at zero and the RESET input at one, and the Q output transitions to a logic one on the line 162, which is differentiated by the capacitor 164, however, the positive transient signal to the AND gate 168 does not change the logic one level on the line 150. Therefore, the Q output of bistable 141 on the line 120 is at a logic one, while the Q outputs of the bistables 140, 142 on the lines 118, 122 are both at zero. The logic one arming signal on the line 120 is presented to one input of the actuator 103 which, as described in detail hereinafter with respect to FIG. 5**, energizes the ARM lamp associated with the selected switch to provide a visual indication to the pilot of the arming of the switch.

If the button 72 is not released, and the IR transmitter 14 is directed away from the switch 32*b* such that neither the switch 32*b*, nor any other one of the switch sensors are being irradiated, the signal on the line 138 again transitions to a logic one, enabling AND gates 143, 145 and 149 which again enable bistables 140, 142. However, these bistables do not change states and the signals on lines 118, 122 remain at a logic zero. Similarly, the AND gate 144 and bistable 141 remain enabled and the signal on the line 120, i.e. arming signal, remains at a logic one. The AND gate 149 provides a logic one on the line 151 which removes the inhibit and allows the counter *154* to count the $\Delta T_2$ time interval. At the determined count threshold the counter output on the line 156 transitions to a logic one, which is inverted by the gate 158, and presented to the RESET input of the bistable 153. A SET-RESET combination of one, zero changes the Q output to a logic zero which is differentiated by the capacitor 164, again causing a transient logic zero state at the input of the AND gate 168. The resultant transient zero on the line 150 inhibits all of the AND gates 143 through 145, causing a RESET of the bistable 141 to a zero logic on the line 120, which removes the arming signal and the actuator 103 is disarmed. Therefore, although the selected visually activated switch is not continually irradiated, so long as it is irradiated for the minimum $\Delta T_1$ time, it remains armed for the $\Delta T_2$ time interval after irradiation has ceased, so long as no other switch is irradiated. This feature is considered optional, but it allows for the inadvertent removal of the IR beam from the selected switch due to pilot movement, or aircraft vibration, while allowing the pilot to continue with the actuation of the selected switch within the $\Delta T_2$ interval. An optimum value of $\Delta T_2$ may be somewhere in the range of one-half, to one and one-half seconds, but this is optional and dependent on the operating environment.

If, after the selected visually activated switch (32*b*) has been irradiated for the minimum $\Delta T_1$ time, the transmitted IR light beam is directed to a second switch within the $\Delta T_2$ interval, the output signal from the filter corresponding to the subsequently irradiated switch transitions to a logic zero while the output signal of the filter 133 transitions to a logic one. The AND gate 144 is immediately inhibited and the bistable 141 is reset to a Q output of zero, disarming the actuator 103. Thereafter, the newly selected, irradiated switch arming circuitry provides a logic one arming signal at the output of the corresponding one of the bistables 140, 142, causing the corresponding actuator to be armed. If by some possibility two or more of the sensor switches are irradiated simultaneously, i.e. a failure of the optical focusing of the IR beam which allows a larger incident beam surface area, at least two of the lines 137 through 139 will be at a logic zero, inhibiting all of the AND gates 143 through 145, and 149. As a result the Q outputs of all of the bistables 140 through 142 would be set to a zero such that none of the actuators could be armed.

The output lines 118, 120, 122 from the bistables 140 through 142 are presented to one input of a corresponding one of a plurality of AND gates 180 through 182 which receive the signal on the line 82 from the trigger switch assembly 28 at a second input thereof. The output signals from the AND gates are presented through lines 117*a*, 119*a* and 121*a* to the clock input of a corresponding one of a plurality of bistable devices 188 through 190, such as D edge triggered flip flops, and to a corresponding one of the actuators 102 through 104. The D input of the bistables 188 through 190 are connected through resistors 192 through 194 to the voltage source 64 which provides a voltage signal at a logic one level. The Q and $\overline{Q}$ signal outputs of the bistables are presented on the lines 117*b, c,* 119*b, c* and 121*b, c* respectively to other inputs of a corresponding one of the actuators 102 through 104.

The AND gates 180 through 182, bistables 188 through 190 and their associated circuitry comprise the control unit actuator signal circuitry. In operation, irradiation and arming of a visually activated switch, such as the switch 32*b*, results in a logic one arming signal on the line 120 to one input of the AND gate 181. With the button 72 depressed to the (b) detent the signal on the line 82 is at a logic zero and the AND gate 181 is inhibited. At the release of the button, the line 82 signal transitions to a logic one, enabling the AND gate 181, which provides a logic one on the line 119*a* to the clock input of the bistable 189. The bistable toggles, or changes states at the Q and $\overline{Q}$ outputs and, assuming the associated apparatus is previously de-energized, the Q output transitions to a logic one, and the Q output to a logic zero, on the leading edge of the logic one signal on the line 185. The combined Q and $\overline{Q}$ signals from each of the bistables 188 through 190, comprise a control actuate signal to each of the corresponding actuators. In the embodiment of FIG. 1, the state of Q at a logic one and $\overline{Q}$ at a logic zero provide energizing of the associated apparatus, while the reciprocal Q, $\overline{Q}$ state provides de-energizing. Since the bistables 188 through 190 have logic one level D inputs, they change state only on the leading edges of successive clock signals. Therefore, the logic one on the line 119*b* and logic zero on the line 119*c* are maintained until the appearance of the leading edge of a second signal on the line 119*a*, which occurs only by irradiating the switch 32*b* a second time to repeat the arming and actuating process described. Therefore, irradiation of a visually activated switch is required to both energize and de-energize the apparatus associated with the respective switch. This is analogous to the manual actuation of the equipment through a momentary contact mechanical switch, where depression of the switch is required to activate the equipment, and a subsequent depression of the switch is required to deactivate the equipment.

Referring now to FIG. 5, an illustrative embodiment of the actuator 103 includes a latching relay 196, of a type known in the art, having a SET coil 197, a RESET coil 198, and four sets of contacts 199–202. Each set of contacts are single pole double throw type which include a SET (S) and RESET (R) terminal, and the contact sets are selectively operable in each in dependence on the energizing of the respective SET and RESET coils. The Q signal from the bistable 189 on the line 119*b* is presented to one input of an AND gate 203, and the $\overline{Q}$ signal on the line 119*c* is presented to one input of a second AND gate 204. The clock signal on the line 119*a* is presented to second inputs to each of the AND gates. The signals from AND gates are presented through lines 205, 206 and capacitors 207, 208, to one side of the SET coil and RESET coil respectively, the other sides of which are connected to the ground plane 66. The line 99 from the manual switch assembly 96 (FIG. 1) within the visually activated switch 32*b*, is connected through a resistor 209 to one output of the voltage source 64, and to one side of a capacitor 210, the other side of which is connected to the wiper of the switch contacts 202. The SET and RESET terminals of the contacts 202 are connected to the SET and RESET coils 197, 198, respectively, on the side common with the capacitors 207, 208. The arming signal on the line 120 is presented through a lamp driver 212 to the wiper of the contacts 200, the RESET terminal of which is connected to the ARM lamp 36*b*. Also, a voltage signal on the line 65 is presented to the wiper of the switch contacts 199, the SET and RESET terminals of which are connected to the ON, and OFF lamps of the light assembly 38*b*. The wiper of the contact SET 201 is connected through a line 214 to one input of the associated equipment 215 whose operating state, i.e. energized, de-energized, is to be controlled. The SET terminal of the contact SET 201 is connected through a line 216 to a second input of the equipment 215. The equipment 215 has its input power connected through the lines 214, 216, and contact SET 201, in the same manner as that provided in a typical power switch configuration, such that if the contact SET 201 is in the SET position, the equipment 215 is energized, and when in the RESET position, the equipment is de-energized.

In the operation of the actuator 103, with the equipment 215 de-energized, the latching relay 196 is in the RESET position with all of the wipers of the contact SETS 199–202 as shown. An arming signal on the line 120 is amplified through the lamp driver 212 and presented through the contact SET 200 to illuminate the ARM lamp 36. The appearance of a control actuating signal wherein the Q signal on the line 119*b* is at a logic one, and the $\overline{Q}$ signal is at a logic zero, causes the AND gate 203 to provide a logic one signal on a line 205 while the AND gate 204 remains at a logic zero. The signal on the line 205 is coupled through the capacitor 207 to the SET coil 197, energizing the coil within the transient RC time constant of the capacitor, causing the wipers of the contact SETS 199–202 to transition to the SET terminal. As a result, the ARM lamp 36 and OFF lamp are extinguished, and the ON lamp and the equipment 215 are energized. The equipment 215 is de-energized by a second irradiation of the visually actuated switch 32*b* setting the Q signal on the line 119*b* to a zero and the $\overline{Q}$ bar signal on the line 119*c* to a one. In response, the output signal from the AND gate 204 on the line 206 transitions to a one and the signal on the line 206 to a zero. The line 205 signal is presented through the capacitor 208 to the RESET coil 198, energizing the coil and causing the wipers of the contact SETS 199–202 to again transition back to the RESET (R) terminal. At any time, the corresponding one of the switches 32*a*–32*c* may be manually actuated through the corresponding one of the switch assemblies 95–97. A manual actuation of the switch 32*b* through momentary depression of the switch 96 causes the signal on the line 99 to transition to a logic one which is coupled through the capacitor 210 to the appropriate one of the relay coils as determined by the instantaneous position of the wiper of the switch contact SET 202. In this manner, the visual activation of the switches may be overridden by the manual actuation, allowing for full flexibility of choice on the part of the human operator.

Figure 7:
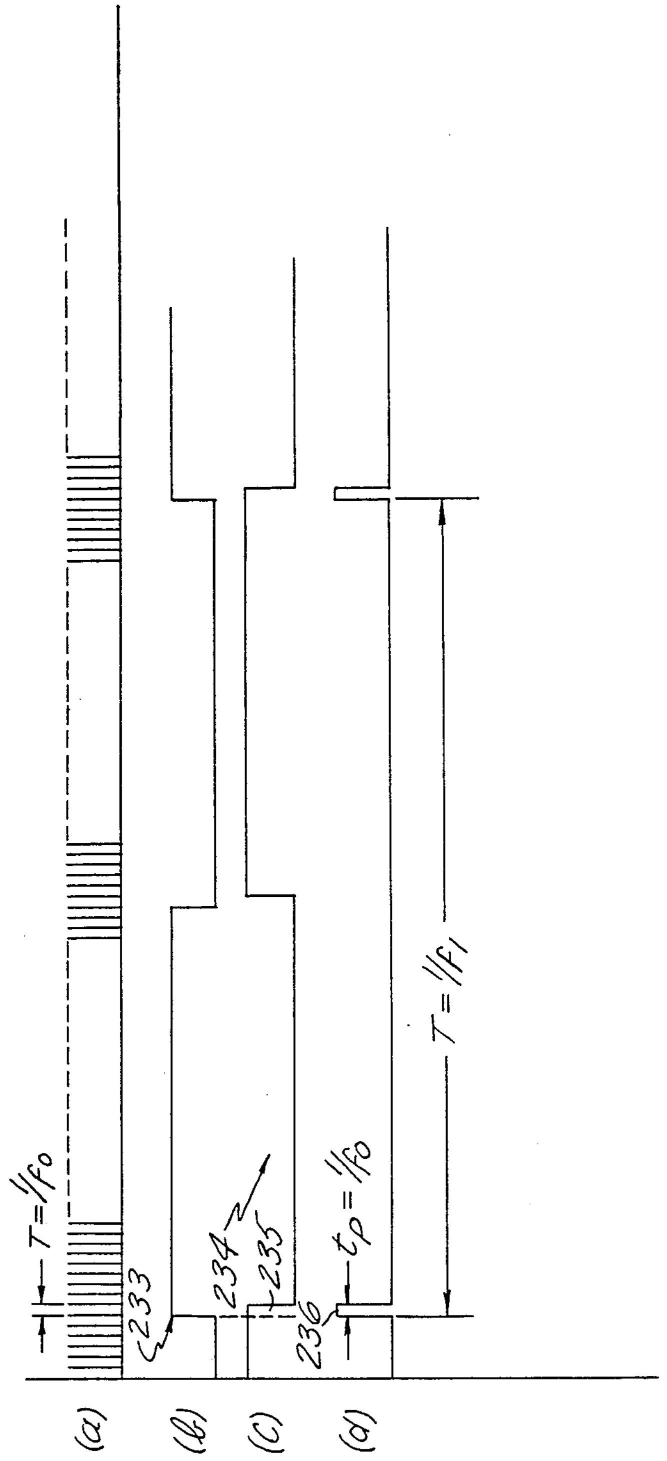
FIG. 7 is an illustration of another set of switching wave forms used in conjunction with the description of the embodiment of FIG. 1.

Referring again to FIG. 1, the pulse modulated signals on the line 76 are provided by the pulse forming network 176. The pulse forming network may be any one of a number of such networks known in the art, and in FIG. 1 is shown as including a pair of D edge triggered bistables 220, 222, each receiving the high frequency clock signal $f_o$ on the line 174 at a clock input thereof, and each receiving at a RESET input a gate signal provided on a line 224 from an invert gate 226, which inverts the signal on the line 82. The bistable 220 receives the lower frequency clock signal on the line 178 at the D input and has its Q output connected through a line 228 to the D input of the flip flop 222, and to one input of an AND gate 230. The clock signal on the line 178 is at the frequency $f_1$, which is the PRF of the line 76 pulse moduated signal, and consequently the PRF of the transmitted IR beam. The bistable 222 provides a $\overline{Q}$ output signal through a line 232 to a second input of the AND gate 230, which provides an output signal on the line 76. In the operation of the pulse forming network 176, a logic zero signal on the line 82 is inverted through the gate 226 to enable the bistables 220, 222, allowing the high frequency clock signal $f_o$ (FIG. 7, illustration (a)) to clock both bistables. The bistable 220 provides a Q output signal 233 (FIG. 7, illustration (b)) on the line 228 which is dependent on the $f_1$ signal at the D input. The bistable 222 provides a $\overline{Q}$ output signal (234, FIG. 7, illustration (c)) which is dependent on, but inverted from the Q output of the bistable 220, and which is delayed by one full period (T) of the $f_o$ clock signal, as shown at 235 of FIG. 7, illustration (c). The signals on the lines 228 and 232 are presented to the AND gate 230, which provides in response to a simultaneous logic one signal at both inputs, a pulse 236 (FIG. 7, illustration (d)) having a pulse width $t_p$ equal to the period T of the $f_o$ clock signal, and a PRF equal to the frequency $f_1$. Typically, the $f_o$ frequency may be 640 kilohertz, while the $f_1$ frequency is five kilohertz, resulting in a pulse width of approximately 1.56 microseconds and a duty cycle less than one percent.

The embodiment of the electro-optical switching system of FIG. 1 is desirable for aircraft installation, or any installation where the close proximity of the human operator to the visually activated switches permits the activating source 13 to be hard wire connected to the control unit 40. This hard wire interconnection is preferred for high accuracy systems since the pulse modulated beam is controlled by the timing circuitry of the control unit 40, ensuring signal synchronization, while the interconnection permits the use of a descrete trigger signal for the selected actuator, which enhances system accuracy and reliability. The requirement for a minimum $\Delta T_1$ time duration of switch irradiation prior to arming a selected actuator, and the use of the hard wired, discrete signal actuating signal results in an effective zero false alarm rate with a 0.9999 probability factor of correct operation from the standpoint of IR detection, and the use of a pulse modulated electromagnetic beam and AC coupling of the detected pulses provides a signal-to-noise ratio on the order of 25 db in direct cockpit sunlight, and provides in excess of 30 db with reflected white light ambient conditions. In those instances, however, where complete mobility is desired, i.e. no hard wire or umbilical connection between the activating light source 13 and the control unit 40, a completely portable activating source, and modified control unit may be used, as shown in FIG. 8.

Figure 8:
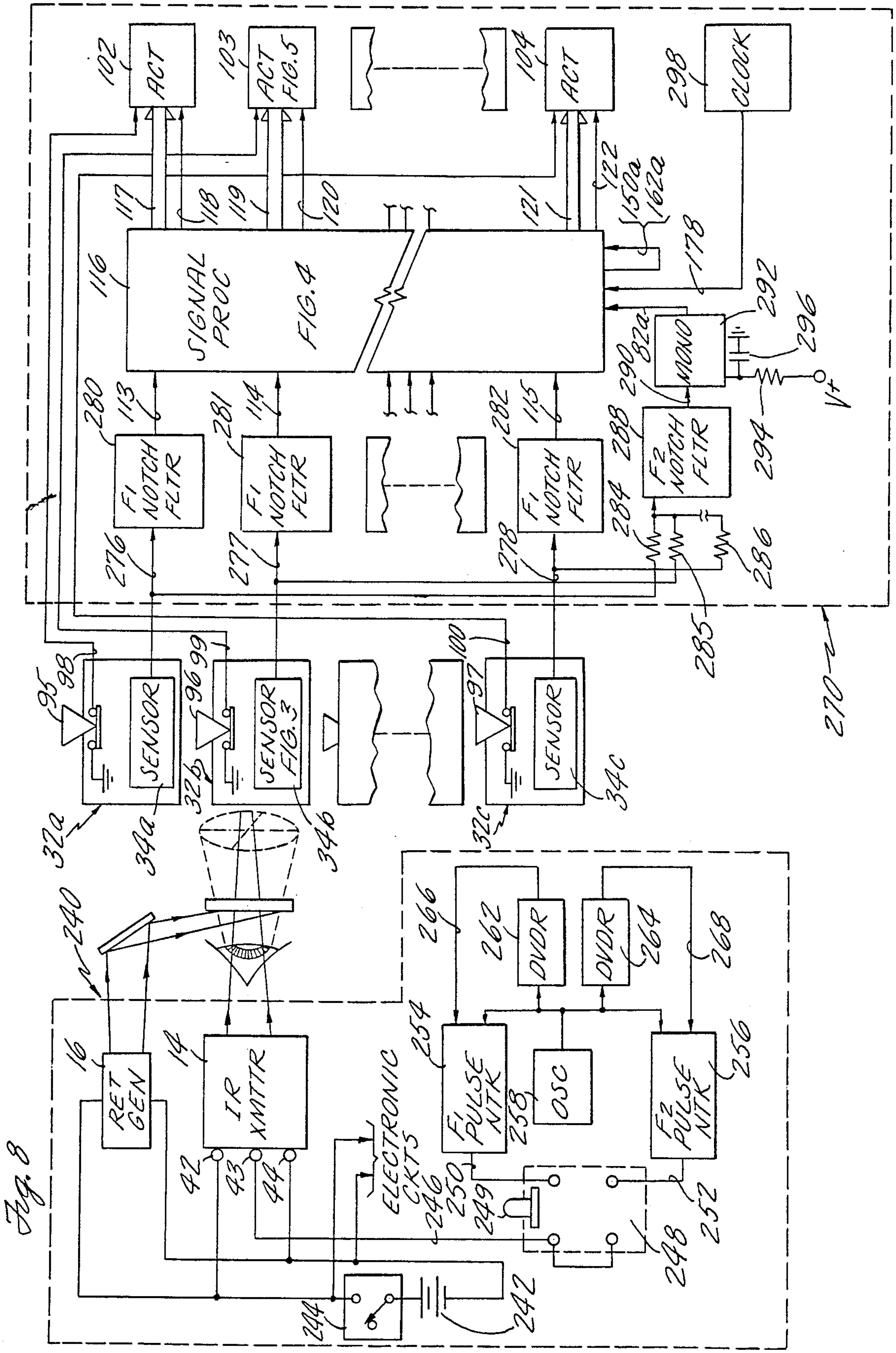
FIG. 8 is a system block diagram of an alternative embodiment of an electro-optical switching system of the present invention.

Referring now to FIG. 8, in an alternative embodiment of an electro-optical switching system an activating electromagnetic source 240 includes an IR transmitter 14 and reticle generator 16 identical to those shown in FIG. 1. The power source for both transmitter and reticle generator is provided by a battery 242 of a known type which provides a nine volt output to the transmitter and reticle generator through a power switch 244. The gate terminal 43 of the IR transmitter 14 is connected through a line 246 to one contact in each of the two detents (a), (b) of a two detent switch assembly 248 having a button 249. The opposite contacts of each detent are connected through lines 250, 252, to pulse forming networks 254, 256 similar to the pulse forming network 176 of FIG. 1, which provide pulse modulated output signals having a PRF equal to $F_1$ and $F_2$ respectively, where the ratio of $F_2$ to $F_1$ is typically on the order of four to one. An oscillator 258 provides a high frequency clock signal on a line 260 to one input of each of the pulse forming networks 254, 256, and to the input of each of two frequency dividers 262, 264, which divide down the clock signal to provide the $F_1$ and $F_2$ frequency signals respectively. In a typical embodiment, the oscillator provides a clock signal at 640 kilohertz, which the divider 262 divides down by $2^9$ counts to provide a 1.25 kilohertz signal through a line 266 to the second input of the pulse network 254, and the divider 264 divides down by $2^7$ counts to provide a 5.0 kilohertz signal through the line 268 to the second input of the network 256.

In operation, nine volt power is presented to the IR transmitter 14 and reticle generator 16 through the switch 244, which energizes the reticle generator to provide the reticle image. The operator aims the centerline of the image on a determined surface portion of a selected one of the visually activated switches and depresses the button 249 to the (a) detent position, connecting the output of the pulse network 252 to the line 246, and causing activation of the IR transmitter. The transmitter provides the modulated electromagnetic beam, as described hereinbefore, at a PRF of $F_1$. Once the operator receives the visual indication of the arming of the selected switch, the button 249 is depressed to the (b) detent position which connects the $F_2$ signal output from the pulse network 256 to the line 246. In response, the transmitter 14 provides the pulse modulated beam at a PRF equal to $F_2$. As described in detail hereinafter, the $F_1$ signal frequency is used to arm the selected one of the visually activated switches, while the $F_2$ signal frequency provides actuation of the corresponding actuator. p The circuit components of the activating light source 240 typically comprise low power, CMOS type logic circuitry which operate over a voltage range of 3 to 18 volts, making the output of the battery 242 non-critical. Typically, the pulse networks 254, 256, the oscillator 258, and the dividers 262, 264 require a maximum current excitation of one milliamp while the transmitter 14 and reticle generator 16 typically require 15 milliamps, resulting in a total 16 milliamps current load to the battery 242. Therefore, a typical nine volt battery having a 400 milliamp hour rating, will provide 25 hours of continuous operation on a single battery. The typical power dissipation of the source 240 at 16 milliamps and nine volts is equal to approximately 144 milowatts.

A control unit 270, and a plurality of dual operating, visually activated switches 32*a* through 32*c*, identical to the switches of FIG. 1, which include the manual switch assemblies 95 through 97 and sensors 34*a* through 34*c*, complete the system embodiment of FIG. 8. Each of the sensors provide the pulsed voltage signals representative of the incident, pulsed infrared beam on lines 276 through 278 to a corresponding one of a plurality of $F_1$ frequency filters 280 through 282, and to one side of a corresponding one of a plurality of resistors 284 through 286, the other sides of which are connected to the input of an $F_2$ frequency filter 288. The filters 280 through 282 are notch frequency filters of a type known in the art, which attenuate all signals outside of a narrow frequency passband centered around the tuned filter frequency $F_1$ which is equal to the PRF of the output signal from the pulse network 254. The filter 288 is also a notch frequency filter having a center frequency equal to the PRF of the pulse network 256, or $F_2$. The output signals from the filters 280 through 282 are presented through the lines 113 through 115 to the signal processor 116, which is identical to that of FIG. 4.

The output of the filter 288 is presented through a line 290 to the input of a monostable 292, identical to the monostables 124 through 126 of FIG. 4, which provides a delayed input response having a time constant equal to 1.5 times the pulse repetition period of the $F_2$ signal in dependence on the time constant value provided by the RC combination of a resistor 294 and capacitor 296. The monostable 292 provides the pulsed stretching function described hereinbefore with respect to the monostables 126 through 128 of FIG. 3, however, in contrast, it does not invert the signal on the line 290 but provides a logic one level signal through a line 82*a* to the signal processor 116 in response to the presence of an $F_2$ signal from the filter 288. A clock 298 provides a clock timing signal on a line 178*a* to the signal processor.

Referring to FIG. 4, the operation of the signal processor 116 in the embodiment of FIG. 7 is identical to the operation described hereinbefore with respect to FIG. 1, with the exception of the elimination of the AND gate 168, and the connection of the line 150 directly to the Q output of the flip flop 153 on the line 162, which is shown in FIG. 7 as the line 150*a*, 162*a*.

In FIG. 7, the electromagnetic beam is detected by the selected one of the plurality of sensors 34*a* through 34*c* which provide an output voltage signal at the beam PRF. Assuming the sensor 32*b* is irradiated with an $F_1$ PRF light beam, a voltage signal at a PRF of $F_1$ is presented to the filters 281 and 288. The $F_1$ frequency signal is amplitude attenuated by the filter 288 to a value below the trigger threshold of the monostable 292 since it is outside the filter passband, however, the $F_1$ filter 281 passes the pulsed signal through the line 113 to the signal processor 116. Referring again to FIG. 3, the pulsed signal on the line 113 is stretched and inverted by the monostable 127 and presented to the filter 133, which provides a delayed output response after a time period $\Delta T_1$ to ensure signal validity. The signal on the line 138 sets the Q output of the flip flop 141 to a logic one on the line 120, which arms the actuator 103 as described hereinbefore. Actuation is provided by depressing the button 249 to the second detent (b), causing the transmitter to provide a pulsed beam at the $F_2$ frequency, which is detected by the sensor **34*b*. The $F_2$ sensor signal is attenuated by the filter 281 to an amplitude below the input threshold of the monostable 127, but is passed through the filter 288 to the monostable 292, which provides a logic one signal through the line 82*a* to the processor 116 where it is presented to the second input of the AND gate 181. The logic one signal on the line 82*a* enables the AND gate which provides a logic one signal on the line 119*a* causing a toggle of the flip flop 189 and, assuming a prior logic zero Q output, results in a control actuating signal with a logic one signal on the line 119*b* and a zero on the line 119*c* which is presented to the actuator 103 to turn on the selected equipment as described hereinbefore with respect to FIG. 5**.

The signal on the line 138 is at a logic zero in response to a detected $F_1$ light signal frequency, and as in FIG. 1, the logic zero disables the AND gates 143, 145 and 149, and enables the AND gate 144. The output zero from the AND gate 149 inhibits the counter 154, and sets the Q output of the flip flop 153 at a logic one which is presented through the lines **162*a*, 150*a* to AND gates 143 through 145. When the button 249 is depressed to the second detent 248 to provide the $F_2$ frequency IR beam, the signal on the line 138 retransitions to a logic one, but the Q output of the flip flop 141 remains at a logic one on the line 120. The AND gate 149 transitions to a logic one allowing the counter to count out the $\Delta T_2$ time period, at the end of which the flip flop 153 transitions to a zero and disables the AND gates 144 through 145, resetting the flip flop 141 to a zero and disarming the circuit. Therefore, the actuation of the actuator 103 through transmission of the $F_2$ frequency must occur within the $\Delta T_2$ time interval, otherwise the actuator will be automatically disarmed. As in the embodiment of FIG. 1**, the turning on and off of the actuator is provided by successive irradiation of the selected one of the visually activated switches.

The electro-optical switching system of the present invention permits a human operator to visually select and remotely actuate any one of a plurality of electronic apparatus, such as instrumentation readouts, video display equipment, electromechanical work devices and the like, all of which are located at some determined distance from the operator. The maximum distance between operator and equipment is limited to a visual acuity distance so that the operator is capable of visually sighting optical detectors associated with each of the visually activated switches. The electro-optical switching system of the present invention may provide remote actuation of selected functions, as may be used by the handicapped, or in a high accuracy embodiment may by used in an aircraft for providing "hands off" visual selection and remote actuation of various airborne equipment by the pilot during flight. The electro-optical switching apparatus of the present invention allows a pilot to perform the required switching of the various instrumentation functions with little or no physical displacement of his body, and with his hands on both the throttle and stick. Similarly, although the invention has been shown and described with respect to an illustrated embodiment thereof, it should be understood by those skilled in the art that the foregoing and various other changes, omissions and additions to the form and detail thereof may be made therein without departing from the spirit and the scope of this invention.

Having thus described typical embodiments of our invention, that which we claim as new and desire to secure by Letters Patent is:

1. Electro-optical switching system for providing visual selection and remote actuation of visually selectable electronic apparatus, comprising:

activating source means, adapted for disposal on the anatomy of an operator, and including transmitter means for providing a beam of electromagnetic energy at a determined carrier frequency within the optical frequency spectrum, said beam being transmitted along an axis of propagation in a spatial direction determined by the operator;

visually activated switch means, one for each of an associated one of the visually selectable apparatus, each disposed at a determined visual distance within the field of view of the operator, and each including electromagnetic radiation sensor means having a radiation detection surface for providing a signal manifestation in response to electromagnetic energy at said determined carrier frequency incidnet on said detection surface, the signal manifestation having a time duration coincident with the incidence of the electromagnetic energy on said detection surface;

control means, responsive to the signal manifestations from each of said sensor means, for actuating the associated one of the visually selectable apparatus in response to the presence of a signal manifestation from a corresponding one of said sensors in the absence of concurrent signal manifestations from any of the other ones of said sensors.

2. The system of claim 1, wherein said beam of electromagnetic energy provided by said transmitter means is pulse modulated at a determined carrier frequency and pulse repetition frequency, and wherein each of said electromagnetic radiation sensor means provides said signal manifestation only in response to electromagnetic energy incident on said detection surface at said determined carrier frequency and pulse repetition frequency.

3. The system of claim 2, wherein said activating source means further comprises:

activating switch means having a plurality of control positions, and selectably operable to provide a discrete activating signal in each of said control positions;

reticle generator means, responsive to said activating switch means, for providing a visible reticle image having a visually identifiable center in response to activating signals provided by said activating switch means in at least two of said control positions, said reticle generator means being relatively disposed with said transmitter means to provide boresighting of the visible reticle image along the axis of propagation of the transmitted electromagnetic beam, said reticle generator means including a focusing lens for focusing the reticle image at the same visual acuity distance as the transmitted electromagnetic beam, and wherein said transmitter means provides said pulsed electromagnetic beam in response to an activating signal provided by said activating switch means in a common one of the two control positions responded to by said reticle generator means.

4. The system of claim 3, wherein said activating source means is adapted for disposal on the anatomy of the operator in a fixed relationship to the line of sight of the operator, to provide fixed boresighting and tracking of said visible reticle image to the line of sight of the operator, and to provide manual operation of said activating switch means by the operator while in a stationary position.

5. The system of claim 3, wherein said activating source means further comprises adapting means, including:

mounting means, adapted to be worn on the head of the operator and including a major surface, said recticle generator means and said transmitter means being relatively disposed on said major surface to provide said boresighting of said visible reticle image along the axis of propagation of said electromagnetic beam;

image projection means, secured to said mounting means, and having a transparent major surface extending downwardly into the line of sight of the operator; and optical means, disposed on the major surface of said mounting means, for deflecting said visible optical image downwardly onto said transparent major surface and into the line of sight of the operator.

6. The system of claim 4, wherein said control means provides an arming signal for each of the visually selectable appratus in response to the continuous presence of a signal manifestation from an associated one of said sensor means for a determined time interval in the absence of signal manifestations from any of the other ones of said sensors within said determined time interval, said control means further providing a control actuating signal for a related one of the selectable apparatus in response to a change in activating signals provided by a transfer of said activating switch means from said common control position responded to by said transmitter means and said reticle generator means to another control position during the presence of a corresponding arming signal; and wherein said control means includes actuator means, one for each of the visually activated switch means, and each responsive to corresponding ones of said arming signals and control activating signals, for providing a visual signal identification of the related one of the visually selectable apparatus in response to the presence of a corresponding one of said arming signals, and for providing actuation of the related apparatus in response to a corresponding one of said control actuating signals, the actuation including the energizing and de-energizing of the associated apparatus in dependence on an existing operating state of the apparatus prior to actuation.

7. The system of claim 4, wherein said control means further comprises:

first time delay means, one for each of said sensor means and each responsive to signal manifestations from a corresponding one of said sensor means, for providing a delayed signal manifestation at the end of a first determined time interval in response to the continuous presence of a signal manifestation from a corresponding one of said sensor means during the determined time interval;

second time delay means, responsive to the delayed signal manifestations from each of said first delay means, for providing an inhibit signal at the end of a second determined time interval in response to the absence of delayed signal manifestations from each of said first delay means;

arming signal means, one for each of said first delay means, each responsive to the delayed signal manifestations from all of said first delay means, and each responsive to the inhibit signal from said second delay means, each of said arming means providing said arming signal for an associated one of the visually selectable apparatus in response to the presence of a delayed signal manifestation from the corresponding one of said first delay means in the absence of concurrent delayed signal manifestations from any other one of said first delay means, said arming means maintaining said arming signal for a time duration coincident with the presence of a delayed signal manifestation from a corresponding one of said delay means in the absence of concurrent delayed signal manifestations from any other one of said delay means, said arming means maintaining said arming signal for a time duration equal to that of the second determined time interval in the absence of delayed signal manifestations from all of said first delay means;

actuating signal means, one for each of said arming signal means and each connected for response to said activating switch means and to said arming signal means, said actuating signal means including bistable means operable in either of two signal states in response to the transfer of said activating switch means from said common control position to another control position, which provides a trigger signal, in the presence of an arming signal from a corresponding one of said arming signal means, said control actuating signal having two states corresponding to the two states of said bistable means, said bistable means providing said control actuating signal in each of the two states successively in response to successive trigger signals, said bistable means maintaining said control actuating signal in a corresponding state between successive trigger signals.

8. The system of claim 7, wherein each of said visually activated switch means further includes manual switch means for providing a manual actuating signal in response to manual activation by the operator; and wherein each of said actuator means is responsive to the manual actuating signals from a corresponding one of said visually activated switch means, said actuator means providing actuation of the associated apparatus in response to said manual actuating signals and in response to said control actuating signals.

* * * * *

UNITED STATES PATENT AND TRADEMARK OFFICE
CERTIFICATE OF CORRECTION

PATENT NO. : 4,091,273

DATED : May 23, 1978

INVENTOR(S) : William B. Fuller, Edwin F. Potter, Jr. and Melvin A. Marcus

It is certified that error appears in the above-identified patent and that said Letters Patent are hereby corrected as shown below:

Column 7, line 36, delete "FIG. 1" and insert -- FIG. 2 --.

Column 14, line 22, delete "moduated" and insert -- modulated --.

Column 14, line 57, delete "descrete" and insert -- discrete --.

Column 15, line 57, delete "p".

Column 18, lines 21 & 22, delete "incidnet" and insert -- incident --.

Column 19, line 26, delete "appratus" and insert -- apparatus --.

Signed and Sealed this

*Tenth* Day of *October 1978*

[SEAL]

*Attest:*

RUTH C. MASON
*Attesting Officer*

DONALD W. BANNER
*Commissioner of Patents and Trademarks*